Figure 1:
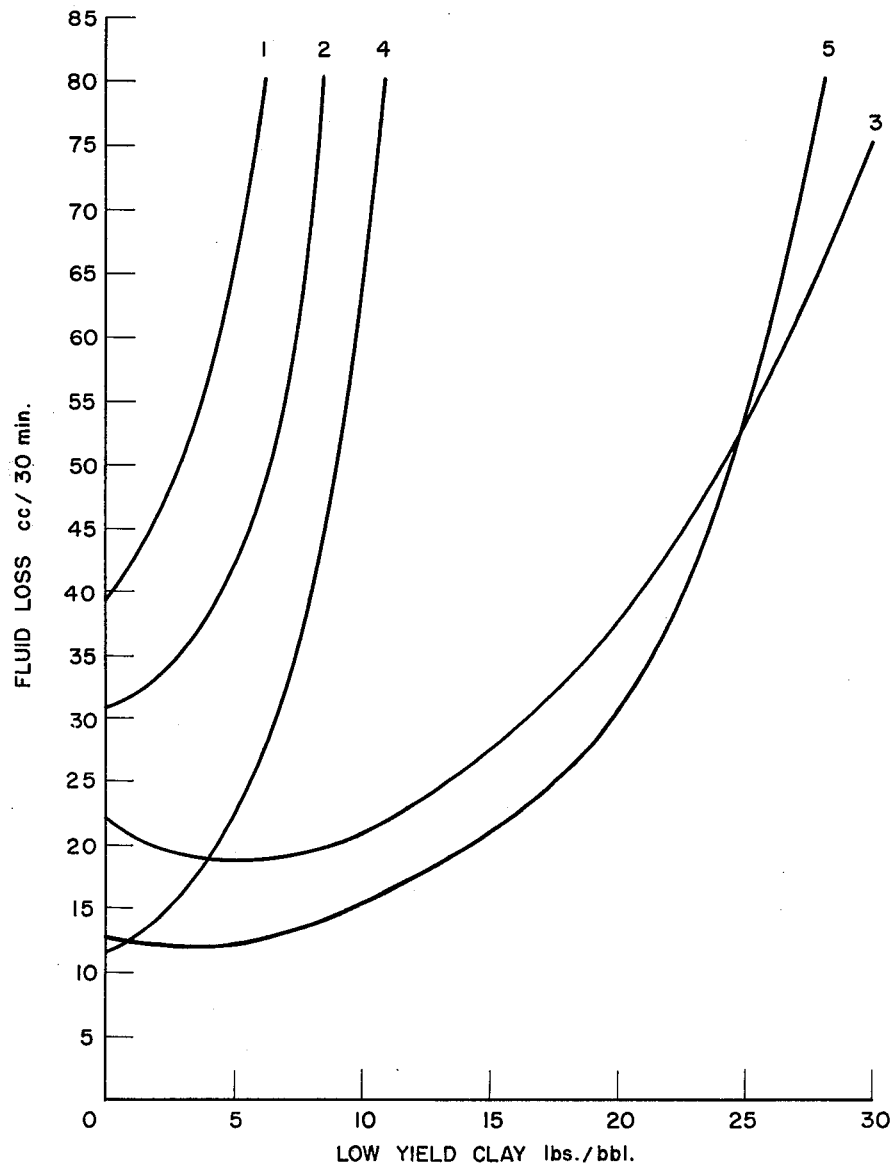

United States Patent Office 3,110,668
Patented Nov. 12, 1963

3,110,668
EMULSION DRILLING FLUID
Duane B. Anderson, James L. Lummus, and Arthur Park, Tulsa, Okla., assignors to Pan American Petroleum Corporation, Tulsa, Okla., a corporation of Delaware
Filed Dec. 28, 1960, Ser. No. 79,022
9 Claims. (Cl. 252—8.5)

The present invention is concerned with well drilling fluids. More particularly, it relates to low-solids or clear-water drilling compositions and to a means for imparting to such compositions low fluid loss and good lost circulation characteristics.

Briefly, the drilling fluids of our invention consist of a base material comprising a resin emulsion stabilized against solids contamination and high shear rates with a surface-active agent and guar gum. To such a composition a fibrous material such as, for example, finely shredded leather, may be added. Preferably, in preparing the drilling fluid the surface-active agent or agents are first added to water, after which the guar is introduced. The resin emulsion is then added to the resulting mixture and after being rendered homogeneous, such as by agitation, is ready for use.

A drilling, completion or work-over fluid should have a low fluid loss to avoid the buildup of a thick mud filter pack on the wall of the hole and to minimize flushing of a production zone. If a low-density fluid can be used, clear water has the advantages of faster penetration rates, greater footage per bit and lower cost. Moreover, a clear completion or work-over fluid results in a faster and cleaner repair job than does mud.

In using drilling fluids of this type, however, fluid loss frequently is too high. Keeping water in the system and preventing it from leaking into the formation is essential to reducing caving and sloughing of water-sensitive shales, etc. In cases of high fluid loss, it is difficult to circulate the well and to circulate sand and cuttings from it. Also, with high fluid loss or lost circulation there is always the danger of getting tools stuck.

Resin emulsion fluids have previously been proposed, but have not met with unqualified success. Certain of them were stabilized with surface-active agents and have been found to function satisfactorily in the presence of essentially non-hydratable solids such as limestone, quartz, etc. But when hydratable clay solids were encountered, the emulsion was almost immediately broken. Presumably, this result was due, at least in part, to adsorption of the surface-active agent on the clay particles. Also, in some resin emulsion drilling fluids, guar has been used as a stabilizer. But systems of this sort become very unstable at the high shear rates encountered under conventional drilling conditions. Guar by itself has a relatively poor shear strength, and when subjected to high shearing rates loses its stabilizing characteristics.

Accordingly, it is an object of our invention to provide a novel aqueous, low-fluid loss, low-solids composition having the advantages of clear water in drilling operations. It is another object of our invention to supply a fluid loss reducer in clear water and similar drilling fluids which is unaffected by alkaline earth metal ions or other ions, such as sodium and iron. It is also an object of our invention to render the resin or resins in these fluids substantially insensitive to contamination by shale or clay solids with the use of guar and a suitable surface-active agent. It is still another object of our invention to take advantage of the superior sealing action exhibited by the combination of these resin emulsions and leather fibers and utilizing this property to improve the lost circulation characteristics of said fluids. It is a further object of our invention to provide low-solids emulsion drilling fluids which can be subjected to high shearing rates, e.g., 15 to 20 thousand r.p.m., without becoming unstable, by the use of a combination of certain surface-active agents and guar gum.

We have now discovered that a clear-water or low-solids drilling fluid having the above desirable properties can be prepared, with certain modifications, by incorporating in the fluid a significant amount of known natural or synthetic resin emulsion. By "significant" we mean enough emulsion to produce a practical reduction in fluid loss, e.g., a loss of not more than about 30 to 35 cc. in thirty minutes, as determined by the Standard Field Procedure for Testing Drilling Fluids, IV, A.P.I., Test RP–29, 1950. Typically, we desire to employ these emulsions in a concentration ranging from 1 to about 15 pounds per barrel, and preferably from about 4 to about 7 pounds per barrel. To render these emulsions stable to high concentrations of hydratable shale, clay solids, high shear rates and other drilling conditions normally adversely affecting such fluids, we introduce guar, preferably in the form of a finely-divided flour, and a nonionic or cationic surface-active agent. Emulsions originally containing anionic surface-active agents are undesirable, unless further stabilized in accordance with our invention, because they are not stable in the presence of compounds of calcium, magnesium, sodium and similar materials generally encountered during drilling operations. Resin emulsions of the type commercially available, when added to clear-water drilling fluids or the substantial equivalent, become diluted to such an extent that the stabilizing effect of the original surface-active agent, particularly in the presence of clay solids, is reduced to the point that coagulation of the resin or breakdown of the emulsion occurs.

The surface-active agent and guar are added in an amount sufficient to render the emulsion stable in the aqueous system under the drilling conditions contemplated for a given job. The guar flour, which is preferably added after the surface-active agent has been introduced, is generally employed in concentrations of from about .1 to about 1.25 pounds per barrel. In order to impart, in combination with the surface-active agent, the desired stabilizing characteristics to these emulsion fluids, larger quantities of guar may be used; however, we have been unable to observe any material increase in stabilizer effect at these higher concentrations. In any event, the proper amount for a given well can be determined by simple experiment.

Initially, when fresh fluid is used, the fluid loss is rather high until a sufficient concentration of relatively fine solids resulting from the drilling operation appear in the fluid. While we do not desire to be limited to any theory in the explanation of this phenomenon, it is believed that these solids are laid down around or over the openings through which fluid is lost. The resulting layer serves as a foundation or mat on which the finer resin particles can then be deposited to form a substantially liquid impervious skin. Accordingly, when drilling with clear water is started, it is desirable to add, along with the resin emulsion, a small amount, such as from about 0.5 to about 15 pounds per barrel of finely-divided, e.g., 100 to 300 mesh material such as silica flour, ground limestone, ground shale or clay, etc.

An additional factor in selecting and preparing an emulsion in accordance with our invention is concerned with the stability thereof to high-speed agitation. Thus, as a preliminary test a sample of the emulsion should be subjected to high-speed, e.g., 18,000 r.p.m., mixing, such as can be obtained by certain mechanical blenders. All currently available emulsions with which we are familiar, if diluted with clear water, can be broken down when subjected to such high shearing rates and, accordingly, the combination of a suitable surface-active agent plus guar flour should be added to these emulsions to render them stable under the majority of drilling conditions.

At this point it should be mentioned that while a number of emulsion drilling fluids are known to be stable under certain limited ranges of drilling conditions, i.e., in the presence of nonhydratable shale, the advantage of our fluids over the others is that said fluids can be used without change from the point where a fluid other than clear water is required. Thus, a variety of adverse drilling conditions can be successfully dealt with when using the fluids of our invention.

In addition to being of the nonionic or cationic variety surfactant, the latter preferably should be a nonfoamer. This is because those surfactants which foam tend to be kept away from the resin particles and, hence, cannot wet or coat them properly to result in a stable emulsion. Suitable surfactants for our emulsion are those that either coat the resin particles in a more or less permanent manner, or which remain in solution in a condition so that they are readily contacted by said particles. Thus, in the present description and claims, where reference is made to a surfactant or to a surface-active agent, it is to be strictly understood that we not only mean a nonionic or cationic agent, but we also desire these terms to exclude such agents that are primarily foamers. Suitable nonionic surface-active agents that may be used in accordance with our invention are nonylphenoxy polyoxyethylene ethanol, long chain fatty acid esters containing multiple ether linkages, sorbitan monolaurate, alkyl phenol esters, oxyethylated lauryl alcohol, oxyethylated tridecyl alcohol, polyoxyethylene lauric amido amine, long chain fatty acid esters of multiple complex amine linkages, and the like. Examples of cationic surfactants used in preparing our stabilized drilling fluids are alkyl dimethyl carboxymethyl ammonium chloride, alkyl dimethyl hydroxyethyl ammonium chloride, octadecyl dimethyl benzyl ammonium chloride, lauric alkyl amide, and the like.

These surface-active agents are added to the emulsion in stabilizing amounts; a concentration that can readily be determined by simple experiment. Normally, we may use such materials in a concentration of from about 5 to about 40 weight percent, based on the weight of the emulsion, and preferably from about 10 to 20 weight percent, same basis.

As examples of natural resins that may be employed in preparing the emulsions used in our invention, there may be mentioned the following natural materials: Dammar, kauri, copal, amber, mastic, sandarac, natural rubber latex, rosin, and the like. Synthetic resins which may be employed in preparing the emulsions used in our invention are polymeric compounds prepared from monomers, such as vinyl acetate, vinyl stearate, ethyl acrylate, decyl acrylate, dimethyl maleate, butadiene, styrene, acrylonitrile, acrylic acid, vinyl chloride, vinylidene chloride, and the like. As examples of copolymers that may be used, there may be mentioned resins prepared from isoprene and butadiene, styrene and butadiene, vinyl chloride and butadiene, cumarone and indene, vinyl acetate and methyl methacrylate, vinyl acetate and vinyl stearate, vinyl acetate and acrylic acid, gasoline boiling range unsaturates produced as a by-product of gas oil cracking, and butadiene and acrylonitrile. Other resins from which suitable emulsions can be prepared are ter-polymers of styrene, butadiene and vinyl pyridine; butadiene, acrylonitrile and methacrylic acid; styrene, butadiene and methacrylic acid, etc. Emulsions of alkyd resins may also be used. In the case of emulsions prepared from copolymers and ter-polymers, the quantity of each component has not been found to be too critical. Thus, for example, copolymer components may range from about 30/70 to 70/30. A typical composition of ter-polymers useful in preparing our new drilling fluids is a resin containing 11.5 percent styrene, 16 percent vinyl pyridine, and 72.5 percent butadiene.

The expression "resin emulsion," as used in the present description and claims, is intended to refer only to aqueous dispersions or emulsions prepared from resins of the type mentioned above and rendered stable to drilling conditions in the manner described herein.

Generally, these emulsions may vary in solids content from about 30 to about 70 percent, preferably from about 40 to about 60 percent, they have a particle size ranging from about 0.05 to about 1.5 microns, and have a density of from about 8 to about 10 pounds per gallon. Such emulsions prepared from either natural or synthetic resins are normally incorporated into the drilling fluid in concentrations of from about 1 to about 15 pounds per barrel. It should also be pointed out that in making up the emulsion component a single resin emulsion may be used, or a number of such emulsions may be admixed with one another. As far as we have been able to determine in this regard, the action of the resin component is pretty much the same whether it consists of only one polymer, or is comprised of several different resins. Accordingly, the expression "resin emulsion" is to be interpreted as referring to an emulsion containing one or more resins.

Our invention will be further illustrated by reference to FIGURES 1, 2 and 3, demonstrating the effect of clay solids on the stability of resin emulsion drilling fluids under different conditions. Referring specifically to FIGURE 1, the curves therein illustrate the effect of surface-active agents and the combination of surface-active agent and guar have on fluid loss properties of resin emulsions. The fluids used in obtaining the data on which curves 1 to 5 are based had the compositions indicated below:

FLUID FOR CURVE NO. 1

3 pounds per barrel of Piccopale N-3 [1] resin emulsion
1 pound per barrel of vinyl acetate polymer emulsion
1 pound per barrel of higher alkyl phenoxy polyoxyethylene ethanol
2 pounds per barrel of silica flour

[1] This resin is prepared by the polymerization of unsaturates derived from the deep cracking of petroleum. The emulsion contained from 40 to 50 weight percent solids, and weighed approximately 8.5 pounds per gallon.

FLUID FOR CURVE NO. 2

3 pounds per barrel of Piccopale N-3 resin emulsion
1 pound per barrel of vinyl acetate polymer emulsion
2 pounds per barrel of higher alkyl phenoxy polyoxyethylene ethanol
2 pounds per barrel of silica flour

FLUID FOR CURVE NO. 3

3 pounds per barrel of Piccopale N-3 resin emulsion
1 pound per barrel of vinyl acetate polymer emulsion
1 pound per barrel of higher alkyl phenoxy polyoxyethylene ethanol
.25 pound per barrel of guar flour
2 pounds per barrel of silica flour

FLUID FOR CURVE NO. 4

4 pounds per barrel of vinyl acetate polymer emulsion
1 pound per barrel of styrene-butadiene copolymer emulsion
0.5 pound per barrel of higher alkyl phenoxy polyoxyethylene ethanol
0.5 pound per barrel of long chain fatty acid ester of multiple complex amine linkages
2 pounds per barrel of silica flour

FLUID FOR CURVE NO. 5

4 pounds per barrel of vinyl acetate polymer emulsion
1 pound per barrel of styrene-butadiene copolymer emulsion
0.5 pound per barrel of higher alkyl phenoxy polyoxyethylene ethanol 0.5 pound per barrel of long chain fatty acid ester of multiple complex amine linkages
2 pounds per barrel of silica flour
.25 pound per barrel of guar flour The fluid loss properties of the compositions mentioned immediately above were determined by the Standard Field Procedure for Testing Drilling Fluids, IV, A.P.I., Test RP–29, 1950. The tests were carried out in an ordinary Baroid filter press. The material under test was placed in the press, subjected to an air pressure of 100 p.s.i., and the amount of fluid passing through the screen in 30 minutes noted. Prior to the test, all samples were agitated to assure uniformity.

From an inspection of the above plots, it will be seen that while emulsion drilling fluids can be stabilized against relatively low concentrations of clay solids, as shown by curves 1, 2 and 4, fluid loss increases very rapidly at clay concentrations of about 5 pounds per barrel, and above. On the other hand, by adding guar to emulsion fluids containing from about 5 to about 40 weight percent of a surface-active agent or agents, based on the weight of the emulsion, a decided improvement in fluid loss characteristics is demonstrated, as may be seen from curves 3 and 5. The differences between these curves are attributable primarily to the different emulsions and surface-active agents employed. It will be observed, however, that the general favorable effect on fluid loss properties is shown by both fluids.

Figure 2:
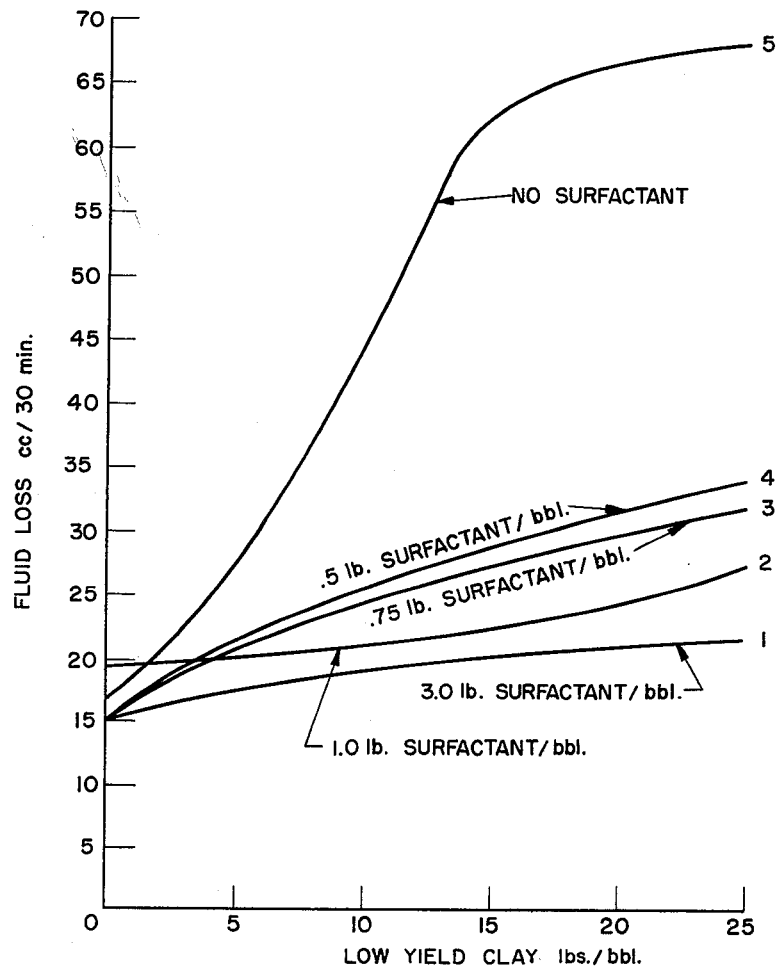
Figure 3:
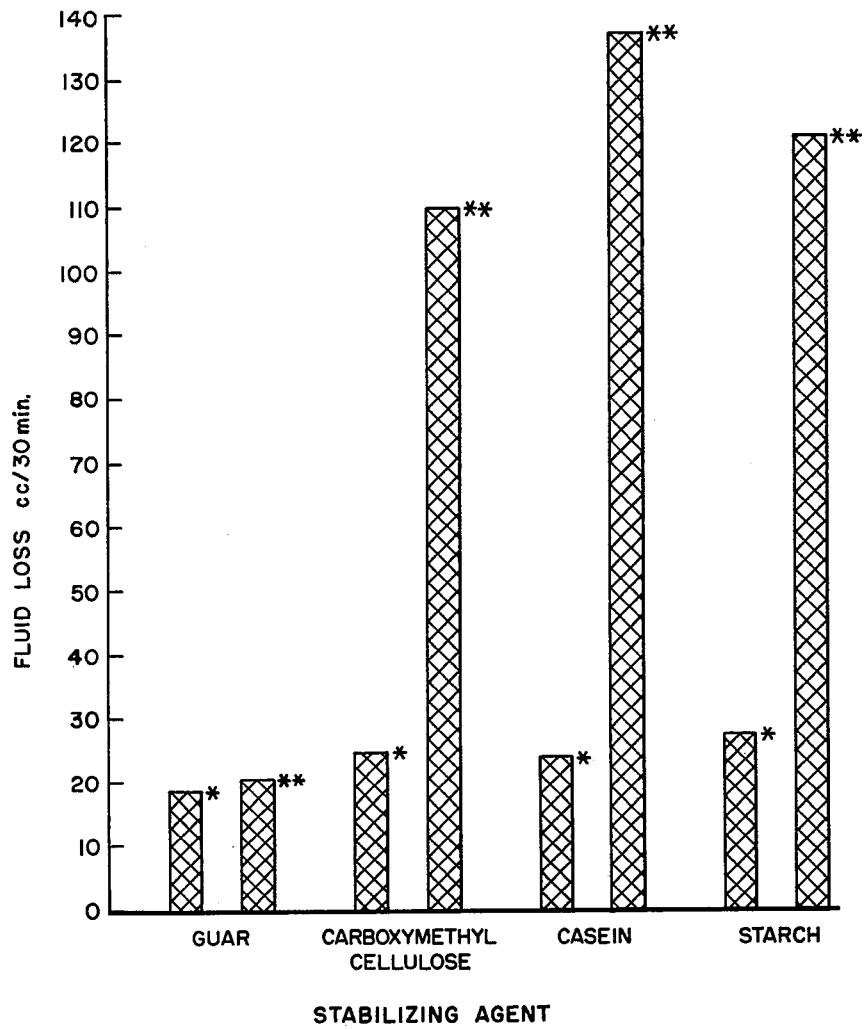

FIGURE 2 illustrates the marked effect that the combination of surface-active agents and guar has on fluid loss properties of emulsion drilling fluids in the presence of clay solids. The effect of surface-active agent concentration on fluid loss of muds containing guar is also shown. The composition of the five different fluids tested in obtaining the data forming the basis of the curves appearing in FIGURE 2, appears below:

FLUID FOR CURVE NO. 1

3 pounds per barrel of Piccopale N–3 resin emulsion
1 pound per barrel of vinyl acetate polymer emulsion
3 pounds per barrel of higher alkyl phenoxy polyoxyethylene ethanol
.25 pound per barrel of guar flour
2 pounds per barrel of silica flour

FLUID FOR CURVE NO. 2

3 pounds per barrel of Piccopale N–3 resin emulsion
1 pound per barrel of vinyl acetate polymer emulsion
1 pound per barrel of higher alkyl phenoxy polyoxyethylene ethanol
.25 pound per barrel of guar flour
2 pounds per barrel of silica flour

FLUID FOR CURVE NO. 3

3 pounds per barrel of Piccopale N–3 resin emulsion
1 pound per barrel of vinyl acetate polymer emulsion
.75 pound per barrel of higher alkyl phenoxy polyoxyethylene ethanol
.25 pound per barrel of guar flour
2 pounds per barrel of silica flour

FLUID FOR CURVE NO. 4

3 pounds per barrel of Piccopale N–3 resin emulsion
1 pound per barrel of vinyl acetate polymer emulsion
.5 pound per barrel of higher alkyl phenoxy polyoxyethylene ethanol
.25 pound per barrel of guar flour
2 pounds per barrel of silica flour

FLUID FOR CURVE NO. 5

3 pounds per barrel of Piccopale N–3 resin emulsion
1 pound per barrel of polyvinyl acetate
.25 pound per barrel of guar flour
2 pounds per barrel of silica flour The fluid loss characteristics of these emulsions were measured by the same procedure as used for the determinations made in FIGURE 1.

As was mentioned previously, stability of guar to high shear rates is one of the outstanding advantages of this material over other substances such as carboxy methyl cellulose, starch, casein, etc., ordinarily regarded as equivalents of guar. A series of tests was made in which the particular stabilizer under investigation was added to a base fluid having the following composition:

| | |
|---|---|
| Water _____cc__ | 350 |
| Piccopale N–3 resin emulsion _____cc__ | 3 |
| Polyvinyl acetate resin emulsion _____cc__ | 1 |
| Silica flour _____g__ | 2 |
| Low-yield clay _____g__ | 5 |

To this mixture was added .25 gram of the stabilizer. In some instances the quantity of surface-active agent used was varied. When all ingredients had been added, the resulting mixture was agitated for 5 minutes in a high-speed (18,000 r.p.m.) blender, after which the fluid loss properties of the mud subjected to such high shear rate were determined in accordance with the procedure previously mentioned. The results obtained are shown in the bar charts of FIGURE 3. The low shear tests were conducted at about 12000 r.p.m., whereas the high-speed mixing was done at shear rates of 18,000 r.p.m.

It will be noted that the only fluid capable of withstanding high shear rates was the one that had been stabilized with guar. This outstanding behavior of drilling fluids containing guar is another factor which renders them operable over a much wider range of conditions than is true in the case of other low-solids fluids.

In some instances where our stabilized emulsion drilling fluids are used, lost circulation problems are encountered. We have found that in many instances where these problems are of a severe nature thay can be satisfactorily solved by adding fibrous leather particles to the above-mentioned emulsions of our invention. Generally, this material is added to the emulsion drilling fluid in a concentration of from about 5 to about 25 pounds per barrel. We have further found that leather fibers, although admittedly known to exhibit properties required for preventing lost circulation, behave peculiarly in this respect under the test conditions we employed. Thus, we have found that the combination of these fibers with the resin emulsions of our invention is capable of preventing lost circulation in circumstances where neither the emulsion nor an aqueous suspension of the leather fibers function satisfactorily. Moreover, such fibers show outstanding ability, in combination with said resin emulsions, to create a system resistant to lost circulation when compared to other well-known lost circulation agents used under the same conditions, as the table below shows. In this particular test a base fluid was prepared having the following composition:

| | |
|---|---|
| Water _____cc__ | 350 |
| Piccopale N–3 resin emulsion _____cc__ | 5 |
| Polyvinyl acetate resin emulsion _____cc__ | 5 |
| Higher alkyl phenoxy polyoxyethylene ethanol _cc__ | 1 |
| Silica flour _____g__ | 2 |
| Guar flour _____g__ | 0.25 |

In each test 10 grams of lost circulation agent being tested was added to an aliquot of the base fluid. Prior to testing the fluid loss properties of these fluids using the same procedure as mentioned above, they were mixed for 5 minutes by means of relatively low-speed (1200 r.p.m.) agitation. The tests were carried out in a Baroid filter press with the filter paper removed, leaving a thirty mesh screen to retain the fluid. Otherwise, the procedure used was the same as that employed in obtaining the data on which the curves of FIGURE 1 are based.

Table

| | Lost Circulation Agent | API Fluid Loss |
|---|---|---|
| 1 | Leather fibers | 168 cc. in 30 minutes. |
| 2 | Polystyrene | Blew through 10 seconds. |
| 3 | Cottonseed hulls | Do. |
| 4 | Ground paper | Blew through 20 seconds. |
| 5 | Walnut shells (medium grind) | Blew through 10 seconds. |
| 6 | Wood fibers | Do. |
| 7 | Pheno Seal [1] (fine grind) | Do. |
| 8 | Base mud | Blew through 5 seconds. |
| 9 | Leather fibers in water | Do. |

[1] Ground flakes of thermosetting resin.

By the present invention we have provided a class of drilling fluids having all the advantages of clear water, together with the added desirable property of low fluid loss. Our invention is not concerned with the resin emulsions themselves, but is considered to reside primarily in a low-solids resin emulsion fluid stabilized against shale and clay solids, as well as high shearing forces, by the combined use of guar and a surface-active agent, as defined herein.

As used in the present description and claims, the expression "low-solids fluids" is intended to refer to fluids containing not more than about 7 weight percent clay solids. Usually, this figures in the range of 3 to about 4 weight percent.

We claim:

1. A clear water; drilling fluid wherein the active ingredients of said fluid consist essentially of; from 1 to about 15 pounds per barrel of an aqueous resin emulsion stabilized against shearing forces of the order of about 18,000 r.p.m. and contamination with clay solids by the combined use of from about 0.1 to about 1.25 pounds per barrel of guar and from about 5 to about 40 percent of a surface-active agent, based on the weight of said emulsion, said agent being selected from the group consisting of nonionic and cationic surface-active agents other than those that are primarily foamers.

2. The drilling fluid of claim 1 in which the resin emulsion is present in a concentration of from about 4 to about 7 pounds per barrel.

3. The drilling fluid of claim 1 to which leather fibers have been added in an amount corresponding to from about 5 to about 25 pounds per barrel.

4. The drilling fluid of claim 1 in which the emulsion is composed of a resin prepared by polymerization of the unsaturates obtained from the deep cracking of gas oil.

5. The drilling fluid of claim 4 to which leather fibers have been added in an amount corresponding to from about 5 to about 25 pounds per barrel.

6. The drilling fluid of claim 1 in which said agent is a nonionic surface-active agent.

7. The drilling fluid of claim 6 to which leather fibers have been added in an amount corresponding to from about 5 to about 25 pounds per barrel.

8. The drilling fluid of claim 1 in which said agent is a cationic surface-active agent.

9. The drilling fluid of claim 8 to which leather fibers have been added in an amount corresponding to from about 5 to about 25 pounds per barrel.

References Cited in the file of this patent

UNITED STATES PATENTS

| 2,473,929 | Wilson | June 21, 1949 |
| 2,494,002 | Rumbold | Jan. 10, 1950 |
| 2,747,839 | Moore | May 29, 1956 |
| 2,751,368 | Yost et al. | June 19, 1956 |
| 2,805,990 | Bergman | Sept. 10, 1957 |
| 2,908,597 | Owen | Oct. 13, 1959 |
| 2,947,715 | Charlet | Aug. 2, 1960 |

FOREIGN PATENTS

| 579,582 | Canada | July 14, 1959 |

OTHER REFERENCES

Mallory: How Low Solids Muds Can Cut Drilling Costs, article in the Petroleum Engineer, April 1957, pages B21, B22, B23 and B24.

Gray: Chemicals in Drilling Mud, article in The Oil and Gas Journal, vol. 56, No. 50, Dec. 15, 1958, pages 90, 94, 95 and 96.